Patented Apr. 28, 1953

2,636,863

UNITED STATES PATENT OFFICE 2,636,863

MANUFACTURE OF ALUMINA-PLATINUM CATALYSTS

Vladimir Haensel, Hinsdale, Ill., assignor to Universal Oil Products Company, Chicago, Ill., a corporation of Delaware No Drawing. Application December 19, 1951, Serial No. 262,487

7 Claims. (Cl. 252—439)

This application is a continuation-in-part of my copending application Serial No. 101,902, filed June 28, 1949, now abandoned.

This invention relates to the conversion of hydrocarbons and to the preparation and use of a novel catalyst therefor.

The present invention is particularly applicable to the conversion of hydrocarbons in processes where cracking or splitting of carbon to carbon bonds is to be minimized or controlled at a predetermined low level. Examples of the first type of conversions include primarily dehydrogenation reactions as, for example, the dehydrogenation of a normally gaseous or normally liquid fraction, or mixtures thereof, to form the corresponding unsaturated hydrocarbons. Another example of reactions of the first type include dehydrocyclization reactions in which a straight chain paraffinic hydrocarbon containing more than 6 carbon atoms is cycled into aromatic hydrocarbons. Still another reaction of this class is hydrogenation in which unsaturated compounds are hydrogenated to the corresponding saturated compounds as, for example, the hydrogenation of an olefin to the corresponding paraffin. While the catalyst is particularly applicable to the treatment of hydrocarbons, it is understood that the catalyst may be used for the conversion of other organic compounds such as alcohols, ketones, esters, ethers, etc. and particularly the unsaturated compounds thereof to convert the same by hydrogenation to the corresponding saturated compounds and the conversion of the saturated compounds by dehydrogenation to the corresponding unsaturated compounds.

An example of the conversion reaction of the second type in which a controlled amount of cracking is desired includes the reforming process. In the reforming process a gasoline of full boiling range or any selected fraction thereof is converted to a reformate of improved antiknock characteristics. In this process, the desired reactions include dehydrogenation, cyclization, isomerization, hydrogen transfer, etc. and a controlled amount of cracking. The cracking must be controlled both in quantity and in quality. Excessive cracking results in the production of normally gaseous products which cannot be used in the reformate and, therefore, results in lower reformate yields. On the other hand, the quality of cracking must be such that $C_5$ and higher molecular weight hydrocarbons are formed in order that the cracked products will be within the gasoline boiling range. Excessive cracking also means higher carbon formation on the catalyst which tends to deactivate the catalyst and requires more frequent regeneration or replacement. It is thus seen that controlled cracking is desirable because it results in a gasoline of higher volatility and also of improved antiknock characteristics.

In one embodiment the present invention relates to a conversion process which comprises subjecting a hydrocarbon to conversion in the presence of a catalyst prepared by treating platinic sulfide with an acid of the group consisting of nitric acid and sulfuric acid, and compositing the resultant material with alumina.

In a specific embodiment the present invention relates to a process for the reforming of gasoline which comprises subjecting said gasoline to contact at reforming conditions with a catalyst prepared by reacting hydrogen sulfide with chloroplatinic acid to precipitate platinic sulfide, washing to remove soluble impurities, treating the platinic sulfide with an acid of the group consisting of nitric acid and sulfuric acid, heating to remove excess acid, compositing the resultant material with alumina pills in the presence of ammonium hydroxide, and heating the composite.

In another embodiment the present invention relates to a method of preparing a catalyst as hereinbefore set forth and to catalysts prepared in this manner.

In another embodiment the catalyst may contain a halogen which preferably is present in an amount of from about 0.05% to about 8% by weight of the catalyst. When the halogen comprises fluorine it preferably is present in a concentration of from about 0.05% to about 3% by weight of the catalyst, and when the halogen comprises chlorine it preferably is present in a concentration of from about 0.2% to about 8% by weight of the catalyst. The bromine or iodine also may be utilized but not necessarily with equivalent results.

In still another embodiment, the halogen may comprise a mixture of two or more of the halogens, but the total amount thereof will be within the range hereinbefore set forth.

It will be noted that the catalysts of the present invention comprise platinum composited with alumina. The use of platinum-containing catalysts has been of limited commercial acceptance because of the high cost of the platinum. It has been found that exceptionally good catalysts containing small amounts of platinum may be made in accordance with the present invention. The amount of platinum is generally within the range of from about 0.01% to about 1% by weight, although in some cases it may range up to about 10% by weight of the alumina. Further, in order to obtain the improved results with low platinum concentrations, it has been found that alumina shows unexpected advantages for use in the catalyst composite. The alumina apparently enters into some peculiar association, either chemical or physical, with the platinum. While it is believed that the platinum is in a combined state with the alumina, it is understood that the platinum, at least at some time during its preparation or use, may be present as free platinum and the use of the term "platinum" in the present specification and claims is intended to include both the combined platinum and the free platinum.

The catalyst of the present invention may be prepared in any suitable manner. While the alumina may comprise naturally occurring alumina, it preferably is precipitated in order that the alumina is free from undesirable impurities such as the alkali earth metals, iron, etc. Precipitated alumina may be readily prepared by adding a suitable reagent, such as ammonium hydroxide, ammonium carbonate, etc. to a salt of aluminum such as aluminum chloride, aluminum nitrate, aluminum acetate, etc. in an amount to form aluminum hydroxide which upon drying is converted to alumina and, in the interest of simplicity, the aluminum hydroxide is referred to as alumina in the present specification and claims in order that the percentages are based on the alumina free of combined water. It has been found that aluminum chloride is generally preferred as the aluminum salt, not only for convenience in subsequent washing and filtering procedures, but also because it appears to give best results. It is understood that the aluminum chloride used in preparing the alumina will itself be free of these undesirable impurities so as not to transfer them to the final catalyst.

After the alumina has been formed, it is generally washed to remove soluble impurities. Usual washing procedures comprise washing with water, either in combination with filtration or as separate steps. It has been found that filtration of the alumina is improved when the wash water includes a small amount of ammonium hydroxide. The washed alumina while still in a wet state may be combined with the platinum in the manner to be hereinafter set forth or the alumina may be dried, formed into particles of uniform or irregular size and shape and calcined prior to commingling with the platinum.

The platinum for compositing with the alumina is prepared in accordance with the following manner. Platinic sulfide is washed thoroughly to remove soluble impurities and then is treated with an acid of the group consisting of nitric acid and sulfuric acid. The platinic sulfide may be prepared in any suitable manner. One particularly satisfactory method is to add hydrogen sulfide to chloroplatinic acid and precipitate platinic sulfide. The time of precipitation may be reduced either by heating to a suitable temperature which generally will be within the range of from about 150° to about 200° F., although higher or lower temperatures may be employed when desired, or by the introduction of a suitable precipitating agent such as aluminum nitrate, aluminum sulfate, aluminum chloride, etc. It is understood that other suitable high valent metal salts may be used in place of the aluminum salt when desired. In place of chloroplatinic acid any other suitable platinum containing compound may be employed including ammonium platinum chloride, trimethylbenzyl ammonium platinum chloride, tetramino platino chloride, ammonium platino nitrate, etc.

It is understood that reference in the present specification and claims to platinic or platinum sulfide includes the disulfide or other polysulfides of platinum. When desired, the platinum sulfide may be obtained in the open market and utilized as the source of the platinum sulfide for reacting with the acid. In accordance with the present invention the platinum sulfide is treated with nitric acid or sulfuric acid. The platinic sulfide readily dissolves in the acid upon heating and the excess acid can be removed by further heating. The temperatures used in general will range from about 200° to about 400° F. although it is understood that higher or lower temperatures may be employed in some cases. When sulfuric acid is used, it is believed that the resultant product is platinic sulfate and, when nitric acid is used, it is believed that the resultant product is platinic nitrate, platinic sulfate or a mixture thereof. Regardless of the chemical composition of the product, it is a soluble material substantially free from undesirable impurities. When desired, of course, the material may be given any further washing or other treatment to remove trace impurities.

The product formed by the treatment of platinic sulfide with the acid is now ready for compositing with the alumina. As hereinbefore set forth, one method of compositing this material with the alumina is to commingle it in the wet state with the wet alumina, with stirring in order to obtain intimate mixing of the components. The product is then dried and formed into particles of definite size and shape and finally calcined. In another embodiment of the invention the resultant product is composited with preformed and dried alumina pills.

The halogen may be incorporated into the catalyst composite in any manner and at any suitable time. In one embodiment the halogen may be composited with the alumina while the latter is either in a wet or dry state and then the platinum composited therewith. In another embodiment the halogen may be composited with the alumina after the platinum has been composited therewith. The halogen conveniently is introduced as a solution of the hydrogen halide as, for example, an aqueous solution of hydrogen fluoride, an aqueous solution of hydrogen chloride, etc.

Regardless of when the material is to be formed into particles of definite size and shape, this is readily accomplished by partially drying at a temperature of from about 200° to about 500° F. for a period of from about 2 to 24 hours or more to form a cake. The cake may be ground into particles of irregular size and shape and then calcined at a temperature of from about 800° to about 1400° F. for a period of from about 1 to about 8 hours or more. When the material is to be formed into particles of uniform size and shape, the partially dried cake is ground, a suitable lubricant such as stearic acid, rosin, hydrogenated coconut oil, graphite, etc. is added, and the material is formed into pills of uniform size and shape in any suitable pelleting, extrusion or other apparatus.

Regarding the calcination temperatures, when the alumina is formed into particles prior to the addition of the platinum, the particles preferably are calcined in air at a temperature of about 1000° to about 1400° F. or more for a period of from about 1 to 8 hours or more. However, after the platinum has been composited with the alumina, the catalyst should not be calcined at a temperature above about 1200° F. and preferably is calcined in air at a temperature of from about 500° to about 1200° F. for a period of from about 2 to 12 hours or more. In one embodiment of the invention the catalyst may be reduced in the presence of hydrogen at a temperature within this range and then calcined in the presence of air at similar temperatures, or the reverse procedure may be employed.

It is a particular feature of the present invention that the catalyst will form very low carbon deposit and, therefore, that the catalyst will have an unusually long life. However, after long periods of service, it may be necessary to regenerate the catalyst and this may be accomplished by treating with air or other oxygen containing gas to burn the carbonaceous deposit therefrom. In general, it is preferred to control the regeneration temperature not to exceed about 1200° F. and preferably the regeneration is effected at a temperature within the range of from about 600° to about 1100° F.

The conditions of operation for effecting the conversion of organic compounds will depend upon the particular reaction desired. Reforming of gasoline will be effected at a temperature of from about 600° to about 1000° F., a pressure within the range of from about 50 to 1000 pounds per square inch or more and a weight hourly space velocity of from about 0.5 to about 10. The weight hourly space velocity is defined as the weight of oil per hour per weight of catalyst in the reaction zone. The reforming operation is preferably effected in the presence of hydrogen and the amount of hydrogen present in the reaction zone generally will be within the range of from about 0.5 to 10 mols of hydrogen or more per mol of hydrocarbon. The reforming process will be operated under conditions to produce hydrogen so that the hydrogen so produced may be recycled within the process and thus obviate the necessity of introducing hydrogen from an extraneous source except at the start of the process. It is understood that the reforming process is applicable to the treatment of a full boiling range gasoline or any selected fraction thereof, and that reference to a gasoline in the present specifications and claims is intended to mean either the full boiling range gasoline or any selected fraction thereof.

In another embodiment the present catalysts are particularly useful in a combination reforming process in which the gasoline is subjected to treatment with the catalyst of the present invention in order to effect primarily aromatization reactions with a minimum of hydrocracking, and the product, either with or without intervening heating or increase in pressure, is subjected to treatment with a hydrocracking catalyst in order to obtain the desired selected or controlled cracking of the gasoline and thereby further improve its antiknock characteristics. Suitable catalysts for the hydrocracking reaction include those containing the catalyst of the present invention together with a hydrocracking component such as a halogen and particularly fluorine, silica in combination with the alumina, with or without a halogen, or alumina with other components which induce mild cracking. This multiple stage operation has the advantage that the amount of carbon formed during the aromatization reaction is kept at a minimum and also that each of these reactions is effected under optimum conditions. The hydrocracking reaction is favored at lower temperatures and higher pressures as compared to the aromatization reaction.

While these conditions will vary with the particular charging stock, catalyst, etc., a suitable process may comprise one in which the aromatization reaction is effected at a temperature of from about 800° to about 1100° F., a pressure of from about 50 to about 700 pounds per square inch, a weight hourly space velocity of from about 2 to about 20 and a hydrogen to hydrocarbon ratio of from about 1 to about 6 mols of hydrogen per mole of hydrocarbon. The hydrocracking is effected at a temperature of from about 600° to about 1000° F., a pressure of from about 500 to about 1000 pounds or more, a weight hourly space velocity of from about 0.2 to about 5, and a hydrogen to hydrocarbon ratio of from about 2 to about 10 mols of hydrogen per mole of hydrocarbon.

As hereinbefore set forth, the catalyst of the present invention is also particularly suitable for use in dehydrogenation reactions and these are generally effected at temperatures of from about 800° to about 1200° F. The catalyst is also particularly suitable for use in effecting hydrogenation reactions which generally are effected at temperatures of from about 200° to 500° F. or slightly higher.

The process of the present invention may be effected in any suitable equipment. A particularly suitable process comprises a fixed system in which the catalyst is disposed in a reaction zone and the hydrocarbons to be treated are passed therethrough in either upward or downward flow. The products are fractionated to separate hydrogen and to recover the desired products. As hereinbefore set forth the hydrogen is preferably recycled for further use in the process. Other suitable units in which the process may be effected include the fluidized type process in which the reactants and catalyst are maintained in a state of turbulence under hindered settling conditions in a reaction zone, the compact moving bed process in which the catalyst and hydrocarbons are passed either countercurrently or concurrently to each other, the suspensoid process in which the catalyst is carried into the reaction zone as a slurry in the reactants, the fluidized fixed bed process in which the reaction is effected under hindered settling conditions in the reaction zone but the catalyst does not leave the reaction zone as in the fluidized type process, etc. In the combination process hereinbefore set forth, two or more of such zones are preferably employed.

The following example is introduced to illustrate further the novelty and utility of the present invention but not with the intention of unduly limiting the same.

EXAMPLE

The catalyst was prepared as follows: Aluminum chloride was reacted with ammonium hydroxide to form aluminum hydroxide which was washed 7 times with ammoniated water and one time with distilled water. The aluminum hydroxide was dried at a temperature of 300° F. and the partially dried material was ground. A lubricant was added and the ground and partially dried material was formed into pills in a pelleting apparatus. The pills were calcined at a temperature of 1300° F.

Platinic sulfide was formed by adding hydrogen sulfide to chloroplatinic acid and then adding a small amount of aluminum chloride. The precipitate was washed thoroughly with water to substantially remove all soluble impurities. The washed material was then treated with nitric acid. The precipitate dissolved readily upon heating and the excess of nitric acid was removed by further heating. The solution thus obtained was a soluble material and was commingled with ammonium hydroxide and then was commingled with the alumina pills by suspending the pills in the solution and removing volatile material by heating. The pills were then calcined at a temperature of about 950° F.

The catalyst as prepared in the above manner contained 0.3% by weight of platinum. This catalyst was used for the reforming of a Mid-Continent naphtha having a boiling range of from 182° to 402° F., a Motor Method octane number of 34.6 and a Research Method octane number of 34.8. Two reforming runs were made, one at a catalyst temperature of 853° F. and the other at a catalyst temperature of 889° F. Both of these runs were made at a pressure of 500 pounds per square inch, a space velocity of 2 and a hydrogen to hydrocarbon ratio of 3 to 1. The results of these runs are given in the following table:

*Table*

| | Run No. 1 at 853° F. | Run No. 2 at 889° F. |
|---|---|---|
| Yield, Wt. percent of charge | 96.0 | 92.4 |
| Product: | | |
| Octane number, Motor Method | 64.2 | 75.1 |
| Octane number, Research Method | 70.1 | 81.5 |
| Carbon, wt. percent of catalyst | 0.20 | 0.24 |

It will be noted from the data in the above table that high yields of high octane gasoline were produced with the catalyst of the present invention. It is particularly noteworthy that the amount of carbon formed during these runs is very low and, therefore, that the catalyst may be used for long periods of time without the necessity of regeneration or replacement.

I claim as my invention:

1. A method of preparing a catalyst which comprises dissolving a sulfide of platinum in an acid of the group consisting of nitric acid and sulfuric acid, compositing the resultant material with alumina, and calcining the composite at a temperature of from about 500° to about 1200° F.

2. A method of manufacturing a catalyst which comprises adding hydrogen sulfide to a platinum-containing solution and precipitating platinic sulfide, washing to remove soluble impurities, dissolving the platinic sulfide in an acid of the group consisting of nitric acid and sulfuric acid, heating to remove excess acid, compositing the resultant material with alumina, and heating the composite at a temperature of from about 500° to about 1200° F.

3. A method of catalyst manufacture which comprises heating a sulfide of platinum with an acid of the group consisting of nitric acid and sulfuric acid to dissolve the sulfide in the acid, further heating the solution to remove excess acid, compositing the resultant material with alumina and heating the composite at a temperature of from about 500° to about 1200° F.

4. A method of preparing a catalyst which comprises dissolving a sulfide of platinum in an acid of the group consisting of nitric acid and sulfuric acid, commingling the resultant material with alumina, drying and pelleting the mixture, and calcining the resultant pills at a temperature of from about 500° to about 1200° F.

5. A method of preparing a catalyst which comprises compositing a halogen with alumina, separately dissolving a sulfide of platinum in an acid of the group consisting of nitric acid and sulfuric acid, compositing the resultant material with the separately formed mixture of alumina and halogen and calcining the composite at a temperature of from about 500° to about 1200° F.

6. A method of preparing a catalyst which comprises commingling an aqueous solution of a hydrogen halide with alumina, separately dissolving a sulfide of platinum in an acid of the group consisting of nitric acid and sulfuric acid, compositing the resultant material with the separately formed mixture of alumina and halogen and calcining the composite at a temperature of from about 500° to about 1200° F.

7. A method of preparing a catalyst which comprises compositing fluorine with alumina by commingling an aqueous solution of hydrogen fluoride with the alumina, separately dissolving a sulfide of platinum in an acid of the group consisting of nitric acid and sulfuric acid, compositing the resultant material with the separately formed mixture of alumina and halogen and calcining the composite at a temperature of from about 500° to about 1200° F.

VLADIMIR HAENSEL.

References Cited in the file of this patent

UNITED STATES PATENTS

| Number | Name | Date |
|---|---|---|
| 2,005,412 | Connolly et al. | June 18, 1935 |
| 2,184,235 | Groll et al. | Dec. 19, 1939 |
| 2,475,155 | Rosenblatt | July 5, 1949 |
| 2,566,521 | Haensel | Sept. 4, 1951 |